United States Patent

[11] 3,633,482

[72] Inventor Hiroshi Tsuda
 Tokyo, Japan
[21] Appl. No. 47,446
[22] Filed June 18, 1970
[45] Patented Jan. 11, 1972
[73] Assignee Olympus Optical Co., Ltd.
 Tokyo, Japan

[54] VIEWER MASK CHANGING DEVICE FOR A MICROSCOPE HAVING PHOTOGRAPHIC CAMERAS
3 Claims, 6 Drawing Figs.

[52] U.S. Cl. .................................................. 95/44 R, 88/1.5
[51] Int. Cl. .................................................... G03b 3/00
[50] Field of Search ........................................ 95/44 R, 44 C; 88/1.5

[56] References Cited
UNITED STATES PATENTS
1,392,759 10/1921 Goddard ...................... 88/1.5
2,187,246 1/1940 Nerwin ........................ 95/44 C
3,118,014 1/1964 Winkler ....................... 88/1.5

*Primary Examiner*—Samuel S. Matthews
*Assistant Examiner*—E. M. Bero
*Attorney*—Kurt Kelman ABSTRACT: Viewer mask changing device for a microscope having at least two photographic cameras each having different size and shape of the frame of the photosensitive material and a viewer receiving a portion of light to be directed to the camera selected for taking a microscopic photograph of an object so as to permit a magnified image of the object to be viewed therethrough while the microscopic photograph is taken. The viewer is provided with a focusing plate located in a plane in which the image of the object is focused and a mask plate rotatably located immediately in front of the focusing plate. The focusing plate has a central rectangular transparent portion the area of which is slightly greater than that corresponding to the size of the frame of the photographic material in any of the cameras and the remaining outer translucent or opaque portion surrounding the central portion, while the mask plate has at least two sets of corner marks each set indicating the corners of the area corresponding to the frame of the photosensitive material in the respective camera. Any of the sets is angularly displaced from the remaining sets about the optical axis of the viewer so that selected one of the sets is positioned in registration with the central portion of the focusing plate by rotating the mask plate while the remaining sets are hidden by the outer portion of the focusing plate, so that the portion of the image to be photographed by the camera selected in connection with the registered set of corner marks is indicated by the registered set of corner marks.

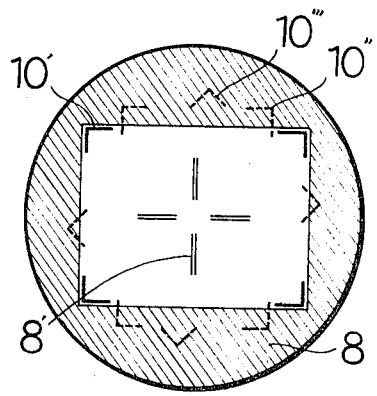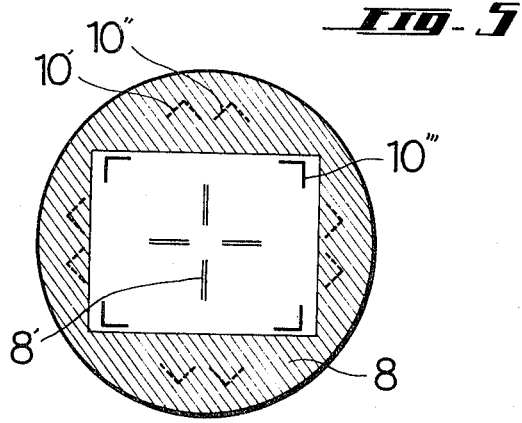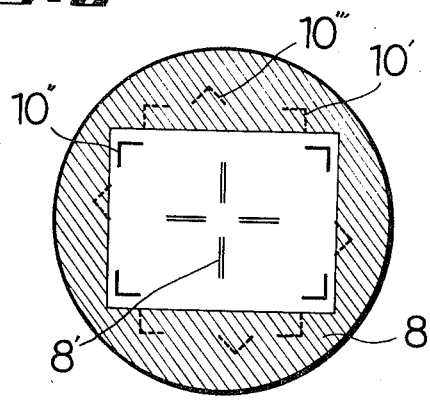

VIEWER MASK CHANGING DEVICE FOR A MICROSCOPE HAVING PHOTOGRAPHIC CAMERAS

BACKGROUND OF THE INVENTION

The present invention relates to a viewer mask changing device for a microscope having at least two photographic cameras alternately usable for taking a microscopic photograph and a viewer by which the portion of the image to be photographed is determined.

In a photographic microscope having a viewer and two or more photographic cameras each having a different size of the frame of the photosensitive material therein and alternately used for taking a microscopic photograph, it is required to provide masks in the viewer each indicating the area of the image of the object to be photographed by the respective camera. However, when two or more masks are formed in a focusing plate of the viewer, the construction is made very complicated and it is difficult to find out the desired mask to be used in connection with the selected camera for taking the photograph. Moreover, the quality of the image to be viewed through the viewer is deteriorated by the existence of the remaining masks appearing in the field of view of the viewer.

It has been proposed for avoiding the above disadvantages to provide a turret or a slider in the viewer in which two or more focusing plates are provided each bearing thereon a mask corresponding to the frame of the photosensitive material of the respective camera, so that the selected one of the focusing plates is brought into the field of view of the viewer by rotating the turret or shifting the slider in connection with the camera selected to take the microscopic photograph. However, such a device is made very complicated in construction and the size of the device is necessarily made great thereby making the cost very expensive.

It has also been proposed to vary the distance of the camera for varying the magnification of the camera depending upon the size of the frame of the photosensitive material therein so that the actual field of view of the viewer is kept the same regardless of the difference in the size of the frame of the photographic material in the camera selected to take the photograph thereby making it possible to use only one and the same mask in the viewer in connection with the various cameras. By such a measure, however, the device is made very complicated in construction and it is very troublesome to vary the magnification so that erroneous judgement to the magnification is liable to be made. Further, the ratio of the height and the width of the frame of the photosensitive material is not necessarily equal to all the photosensitive materials so that it is impossible to take the same area of the image by the photosensitive material having different size even through the magnification is varied.

The present invention aims at avoiding the above-described disadvantage of the prior art.

SUMMARY OF THE INVENTION

An object of the present invention is to provide a novel and useful viewer mask changing device for a photographic microscope having at least two photographic cameras each having different size of the frame of the photosensitive material therein which avoids the above-described disadvantages of the prior art.

Another object is to provide a novel and useful viewer mask changing device of the type described in which at least two sets of masks each corresponding to the respective camera are provided in a rotatable mask plate cooperating with the focusing plate of the viewer, one of the mask being permitted to appear in the field of view of the viewer while the remaining mask is moved away of the field of view thereby facilitating the observation and operation of the microscope.

The above objects are achieved in accordance with the present invention by the provision of the viewer mask changing device which is characterized by a focusing plate provided in the viewer and having a central rectangular transparent portion defining the field of view of the viewer and an outer translucent or opaque portion surrounding the central portion, and a rotatable mask plate located immediately in front of the focusing plate and having at least two sets of corner marks each corresponding to the frame of the photosensitive material in the respective camera, any of the sets of corner marks being angularly displaced from the remaining sets so that one of the sets is registered with the central transparent portion of the focusing plate by rotating the mask plate while the remaining sets are hidden by the outer portion of the focusing plate thereby facilitating the observation of the image of the object and the photographing of the image by the camera selected in connection with the registered set of corner marks.

The rotation of the mask plate to position the selected set in register with the central transparent portion may be coupled with the switching operation of the cameras so as to render the selected camera to be operable in connection with the registered set of corner marks.

The device of the present invention is simple in construction and is manufactured at a low cost.

BRIEF DESCRIPTION OF THE DRAWINGS

FIG. 4 is a view showing a modified form of the mask plate having three sets of corner marks which cooperate with the focusing plate with the mask plate rotated to its first position;

FIG. 5 is a view similar to FIG. 4 but showing the mask plate rotated to its second position; and FIG. 6 is a view similar to FIG. 4 but showing the mask plate rotated to its third position.

DETAILED DESCRIPTION OF THE PREFERRED EMBODIMENTS

Figure 1:
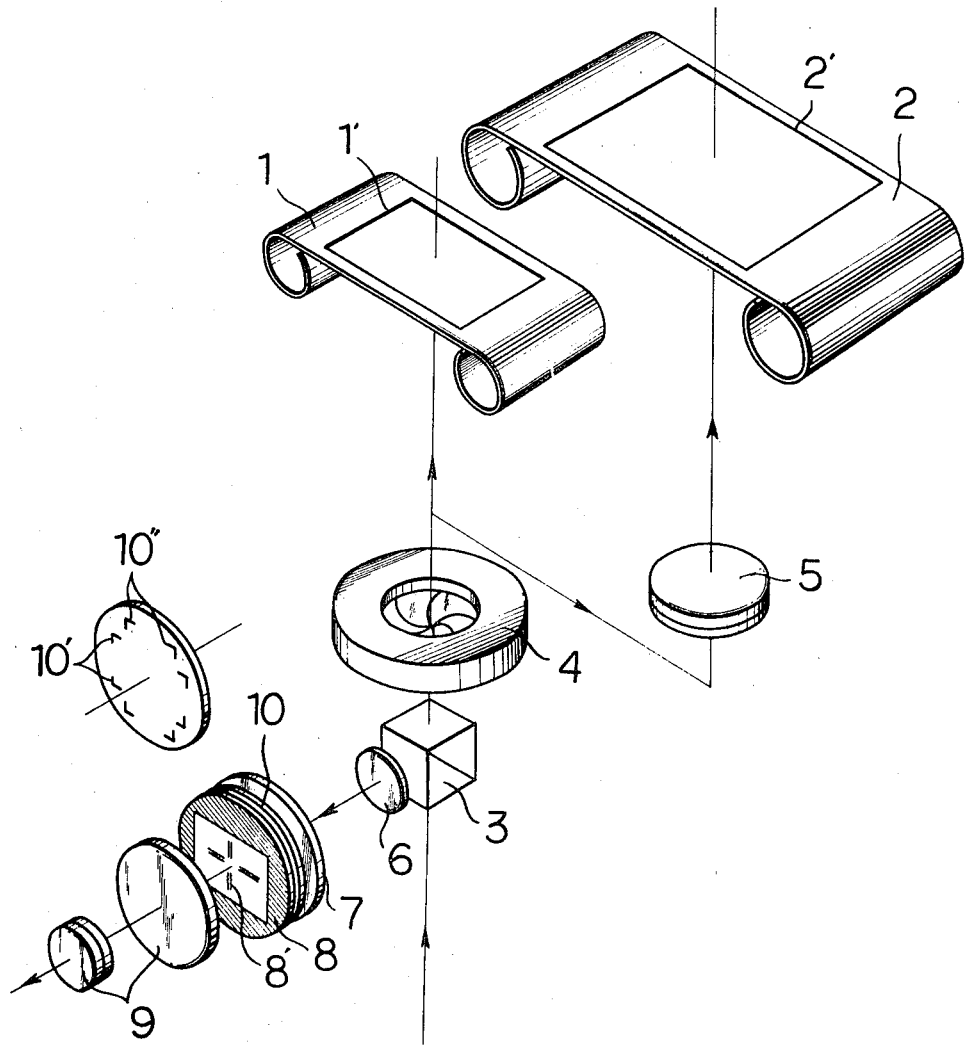
FIG. 1 is a schematic perspective view showing the general arrangement of the photographic microscope used with the device of the present invention.

Referring to FIG. 1, the photographic microscope for use with the device of the present invention comprises a first photographic camera (not shown) in which a photosensitive material 1, i.e., a roll film is loaded and a second camera (not shown) in which a roll film 2 is loaded. The size of the frame of film 1 in which the image of the object is photographed is shown by the numeral 1' while the frame of film 2 is indicated by the numeral 2' which is different in size from frame 1'.

A beam splitting prism 3 and a shutter 4 are arranged in the optical axis of the microscope as shown and the light from the object (not shown) is directed through prism 3 and shutter 4 toward either one of the first camera and, through auxiliary lens 5, the second camera by switching the optical path by switching means (not shown).

A portion of light from the object is reflected by prism 3 toward lens system 6, 7 of the viewer of the microscope and an image of an object is focused by lens system 6, 7 on a focusing plate 8 located in the optical axis of the viewer and having reticules 8' for facilitating the focusing of the image on focusing plate 8. The thus focused image is magnified by magnifying lens 9 and viewed by the observer.

The above-described construction is conventional and, therefore, is not described in detail.

In accordance with one feature of the present invention, focusing plate 8 has a central rectangular transparent portion which is surrounded by the outer translucent or opaque portion indicated by the hatching in FIG. 1. The size and the angular position of the central transparent portion of focusing plate 8 are so determined that the area of the image of the object photographed by either of the frames 1', 2' of films 1, 2 is included in the central transparent portion.

In accordance with the essential feature of the present invention, a mask plate 10 is located immediately in front of focusing plate 8 rotatably about the optical axis of the viewer. In FIG. 1, mask plate 10 is also shown in a position removed out of the optical axis. As shown, mask plate 10 is provided with a first mask, i.e., a first set of corner marks 10' and a second set of corner marks 10'' which is angularly displaced by an angle of about 90° from first set 10'. The size of first set 10' is made to indicate the area of the image of the object which is photographed in frame 1' of film 1 while the size of second set 10'' is indicative of the area of the image which is photographed in frame 2' of film 2.

Figure 2:
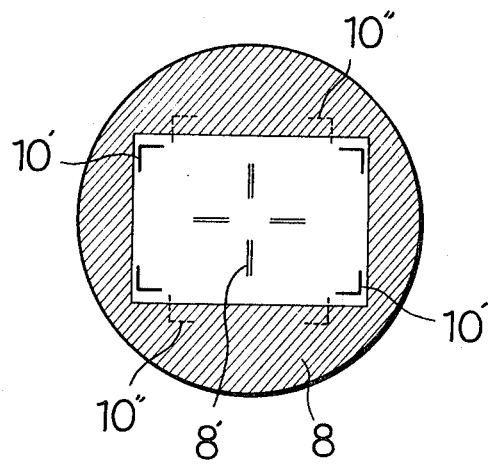
FIG. 2 is a view showing the focusing plate and the mask plate having two sets of corner marks constructed in accordance with the present invention with the mask plate rotated to its one position so that one of the sets is registered with the central transparent portion of the focusing plate.
Figure 3:
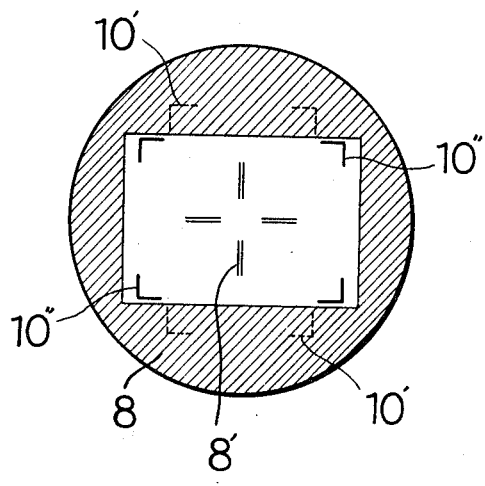
FIG. 3 is a view similar to FIG. 2 but showing the mask plate rotated to its another position so that the other set is positioned in register with the central transparent portion.

Thus, when first set 10' is brought to a position in register with the central transparent portion by rotating mask plate as shown in FIG. 2, second set 10'' is substantially hidden by the outer translucent or opaque portion of focusing plate thereby permitting the area of the image to be photographed in frame 1' of film 1 to be clearly indicated by first set of corner marks 10' without hindrance by second set 10''.

On the other hand, when mask plate 10 is rotated to position second set 10'' in register with the central transparent portion of focusing plate 8, first set 10' is substantially hidden by the outer translucent or opaque portion of focusing plate 8 thereby permitting the area of the image to be photographed in frame 2' of film 2 to be clearly indicated by second set of corner marks 10'' without being disturbed by the appearance of first set 10' in the field of view of the viewer.

As described previously, the operation for rotating mask plate 10 so as to register either one of two sets of corner marks 10', 10'' with the central transparent portion of focusing plate 8 may be coupled with the switching means to render either one of the two cameras selected in connection with the registered set of corner marks to be operable.

FIGS. 4 to 6 show a modified form of the mask plate which is used with a microscope provided with three photographic cameras selectively used for taking the microscopic photograph of the object and having different film frames, respectively. As shown, the mask plate of FIGS. 4 to 6 is provided with three sets of corner marks 10', 10'' and 10'''. Two sets of corner marks 10', 10'' are arranged angularly displaced by about 90° from each other as in the case of FIG. 2, while set of corner marks 10''' is angularly displaced by about 45° from either of two sets 10', 10''. Thus, when the mask plate is rotated to register one of three sets 10', 10'' and 10''' with the central transparent portion of focusing plate 8, the remaining sets of corner marks are substantially hidden by the outer translucent or opaque portion of focusing plate 8 while the registered set of corner marks is indicative of the area of the image of the object to be photographed in the frame of the film in the camera selected to be operable in connection with the registered set of corner marks.

In the similar manner, the mask plate may be provided with four or more sets of corner marks selectively used with four or more cameras used in connection with the selected set of corner marks.

I claim:

1. Viewer mask changing device for a microscope having at least two photographic cameras selectively operable for taking a microscopic photograph of the image of an object by the selected camera and a viewer receiving a portion of light to be directed to said selected camera to permit a magnified image of the object to be viewed therethrough while the microscopic photograph is taken by the selected camera, the frame of the photosensitive material in any of said cameras in which the image of the object is photographed being different in size and shape from that in the remaining camera, wherein the improvement comprises a focusing plate provided in said viewer in a plane in which the image of the object to be viewed through said viewer is focused and a mask plate located immediately in front of said focusing plate and being rotatable about the optical axis of said viewer, said focusing plate having a central transparent portion in the rectangular shape while the remaining outer portion is made at least translucent, said central transparent portion being slightly greater in size and shape than the area corresponding to the frame of the photosensitive material in each of said cameras and angularly positioned so that said area is included in said central transparent portion, said mask plate being provided with at least two sets of corner marks located angularly displaced from each other about the optical axis, each of said sets indicating the corners of the area corresponding to the frame of the photosensitive material in the respective camera, thereby permitting one of said sets to be selectively registered angularly with said central transparent portion of said focusing plate so as to be seen through said central transparent portion while the remaining set is substantially hidden by said remaining outer portion of said focusing plate so that the portion of the image of the object to be photographed in the camera selected to be operable in connection with said registered set of corner marks is determined by said set of corner marks seen through said central transparent portion of said focusing plate.

2. Viewer mask changing device according to claim 1, wherein one of said sets of corner marks is angularly displaced substantially perpendicular to the remaining set.

3. Viewer mask changing device according to claim 1, wherein three cameras are provided and said mask plate is provided with three sets of corner marks each corresponding to the frame of the photosensitive material in the respective camera, said three sets being angularly displaced from each other by an angle of about 45°.

* * * * *